US008286769B2

(12) United States Patent
Neri et al.

(10) Patent No.: US 8,286,769 B2
(45) Date of Patent: Oct. 16, 2012

(54) ROAD VEHICLE INTEGRATED CLUTCH-TRANSMISSION ASSEMBLY

(75) Inventors: Carlo Neri, Modena (IT); Rudolf Morawetz, S. Caterina-Brunico (IT)

(73) Assignee: Ferrari S.p.A., Modena (IT)

( * ) Notice: Subject to any disclaimer, the term of this patent is extended or adjusted under 35 U.S.C. 154(b) by 923 days.

(21) Appl. No.: 11/662,000

(22) PCT Filed: Sep. 2, 2005

(86) PCT No.: PCT/IB2005/002611
§ 371 (c)(1),
(2), (4) Date: Mar. 20, 2009

(87) PCT Pub. No.: WO2006/030267
PCT Pub. Date: Mar. 23, 2006

(65) Prior Publication Data
US 2009/0166147 A1 Jul. 2, 2009

(30) Foreign Application Priority Data
Sep. 3, 2004 (IT) .............................. BO2004A0540

(51) Int. Cl.
*F16D 25/10* (2006.01)
*F16H 57/02* (2012.01)
(52) U.S. Cl. .................... 192/3.58; 192/48.601; 74/330; 74/606 R
(58) Field of Classification Search ............... 192/3.58, 192/48.601, 48.8, 48.9, 112; 74/330, 331, 74/340, 606 R
See application file for complete search history.

(56) References Cited

U.S. PATENT DOCUMENTS

| 4,461,188 A | * | 7/1984 | Fisher .............................. 74/330 |
| 4,499,791 A | * | 2/1985 | Brisabois ......................... 475/71 |
| 5,009,125 A | * | 4/1991 | Machida et al. ............. 74/606 R |
| 5,012,909 A | * | 5/1991 | Machida et al. ............. 192/3.57 |
| 5,058,455 A | | 10/1991 | Nemoto et al. |
| 5,305,848 A | * | 4/1994 | Akutagawa et al. .......... 180/292 |
| 5,404,772 A | | 4/1995 | Jester |

(Continued)

FOREIGN PATENT DOCUMENTS
DE     41 15 989 A1    11/1992
(Continued)

OTHER PUBLICATIONS
International Search Report for PCT/IB2005/002611 dated Mar. 17, 2008.

*Primary Examiner* — David D Le
*Assistant Examiner* — Lillian Nguyen
(74) *Attorney, Agent, or Firm* — Graybeal Jackson LLP

(57) ABSTRACT

An integrated clutch-transmission assembly for a road vehicle; the integrated clutch-transmission assembly has a power-assisted clutch having a number of first hydraulic actuators; a power-assisted transmission having a number of second hydraulic actuators; a high-pressure pump for the hydraulic actuators; a number of solenoid valves for controlling the hydraulic actuators; a housing having a first chamber housing the clutch, and a second chamber housing the transmission; and a flat supporting plate, which is housed removably inside the housing to separate the two chambers of the housing, has a first wall fitted with the clutch, and has a second wall parallel to and opposite the first wall and fitted with the high-pressure pump and at least some of the solenoid valves.

15 Claims, 5 Drawing Sheets

U.S. PATENT DOCUMENTS

| | | | | |
|---|---|---|---|---|
| 5,690,001 A * | 11/1997 | Matsufuji | | 74/606 R |
| 6,230,585 B1 * | 5/2001 | Bator | | 74/606 R |
| 6,393,943 B1 * | 5/2002 | Sommer et al. | | 74/606 R |
| 6,487,924 B2 * | 12/2002 | Matsufuji et al. | | 74/331 |
| 6,499,370 B2 * | 12/2002 | Bowen | | 74/330 |
| 7,073,407 B2 * | 7/2006 | Stefina | | 74/331 |
| 7,127,961 B2 * | 10/2006 | Braford et al. | | 74/340 |
| 7,258,032 B2 * | 8/2007 | Kim | | 74/330 |
| 7,311,187 B2 * | 12/2007 | Koenig et al. | | 192/48.8 |
| 7,942,252 B2 * | 5/2011 | Schnitzer | | 192/3.58 |
| 2005/0034955 A1 * | 2/2005 | Meinhard et al. | | 192/112 |
| 2005/0130795 A1 * | 6/2005 | Kim et al. | | 475/332 |
| 2008/0070749 A1 * | 3/2008 | Schnitzer | | 477/117 |

FOREIGN PATENT DOCUMENTS

WO    WO 2005/037590 A    4/2005

* cited by examiner

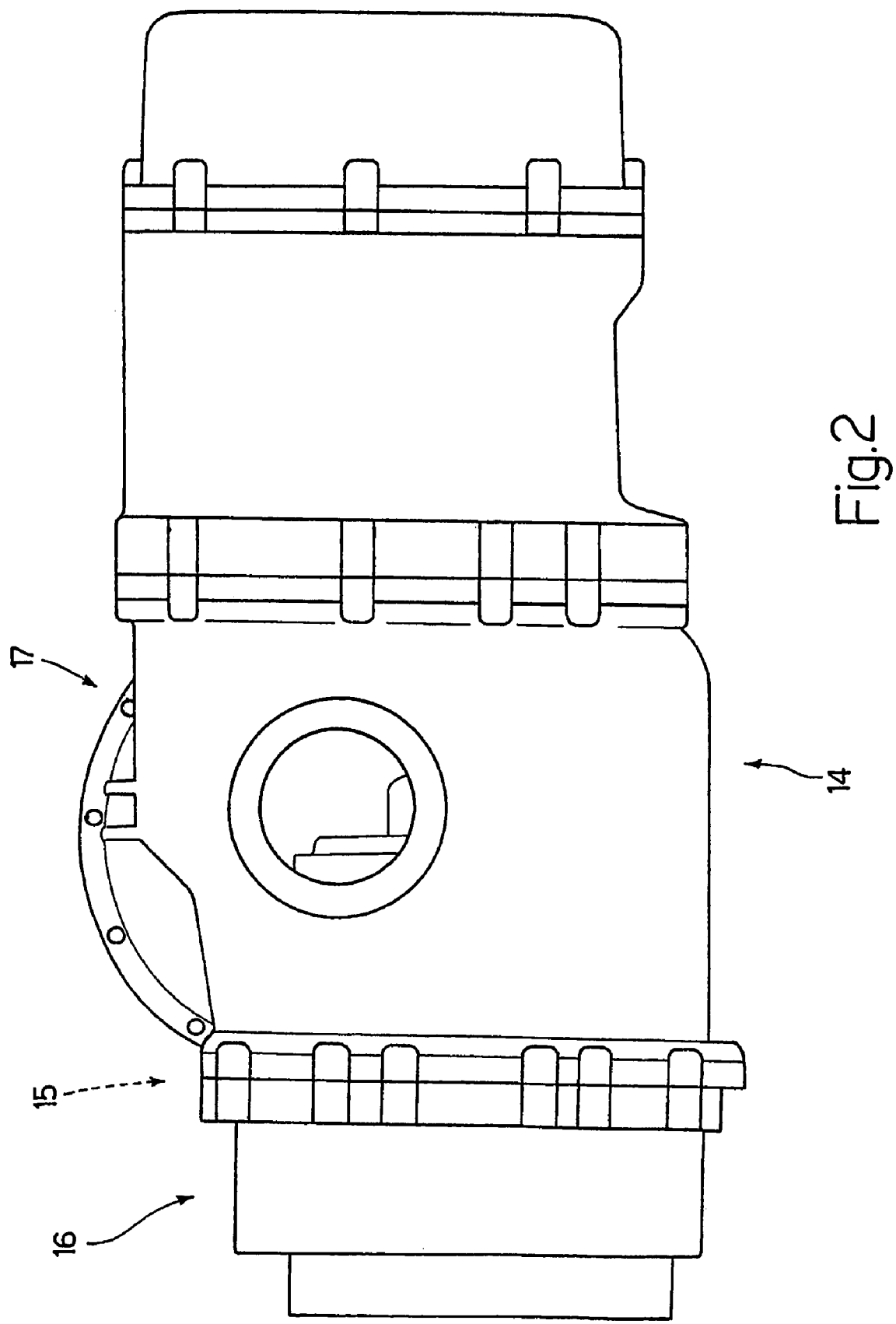

Fig.8

ROAD VEHICLE INTEGRATED CLUTCH-TRANSMISSION ASSEMBLY

PRIORITY CLAIM

This application claims priority to PCT Application No. PCT/IB2005/002611 filed Sep. 2, 2005, which claims priority to Italian Patent Application No. BO2004A000540 filed Sep. 3, 2004, which are incorporated herein by reference.

TECHNICAL FIELD

An embodiment of the present invention relates to a road vehicle integrated clutch-transmission assembly.

BACKGROUND

Power-assisted mechanical transmissions are known, in which the movements necessary to change gear are obtained by means of hydraulic or, more rarely, electric actuators. A power-assisted mechanical transmission is necessarily combined with a power-assisted clutch controlled by one or more hydraulic or electric actuators.

The clutch and transmission are normally physically separate and connected by a propeller shaft, which may vary in length from a few centimeters to a few meters.

It has recently been proposed to integrate the clutch in the transmission casing to form a compact integrated clutch-transmission assembly. Integrating the clutch in the transmission casing also has the advantage of simplifying vehicle assembly by reducing the number of component parts for assembly inside the engine compartment. Known solutions, however, have the drawback of involving complex, time-consuming assembly of the integrated clutch-transmission assembly.

SUMMARY

An embodiment of the present invention is a road vehicle integrated clutch-transmission assembly, which is cheap and easy to produce, while at the same time eliminating the aforementioned drawbacks.

BRIEF DESCRIPTION OF THE DRAWINGS

A number of non-limiting embodiments of the present invention will be described by way of example with reference to the accompanying drawings.

FIG. 2 shows a schematic front view of a housing of the FIG. 1 integrated clutch-transmission assembly.

FIG. 8 shows an operating diagram of a dual-clutch transmission of the integrated clutch-transmission assembly in FIG. 2.

DETAILED DESCRIPTION

Figure 1:
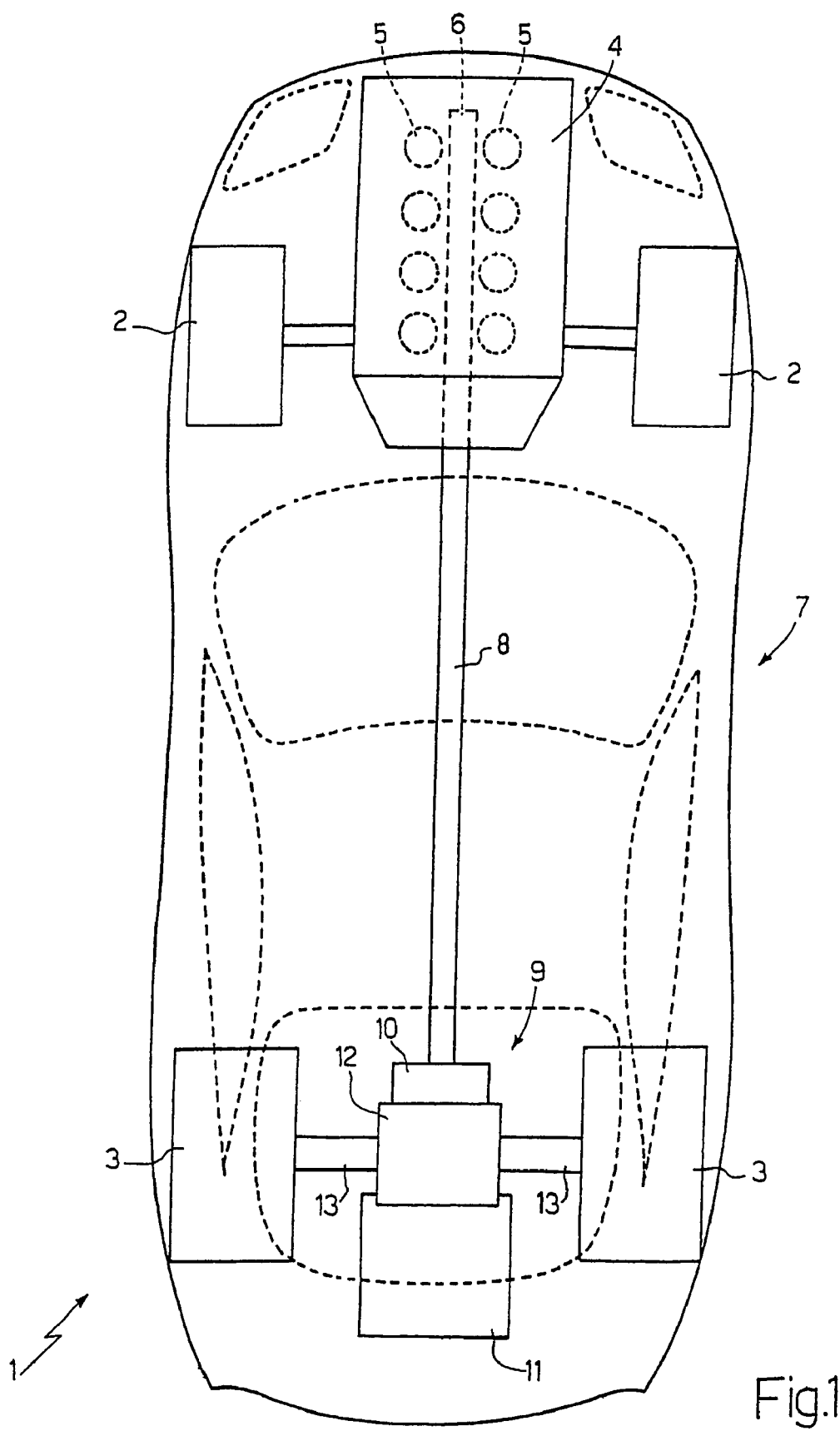
FIG. 1 shows a schematic plan view of a front-engine, rear-wheel-drive car featuring an integrated clutch-transmission assembly in accordance with an embodiment of the present invention.
Figure 5:
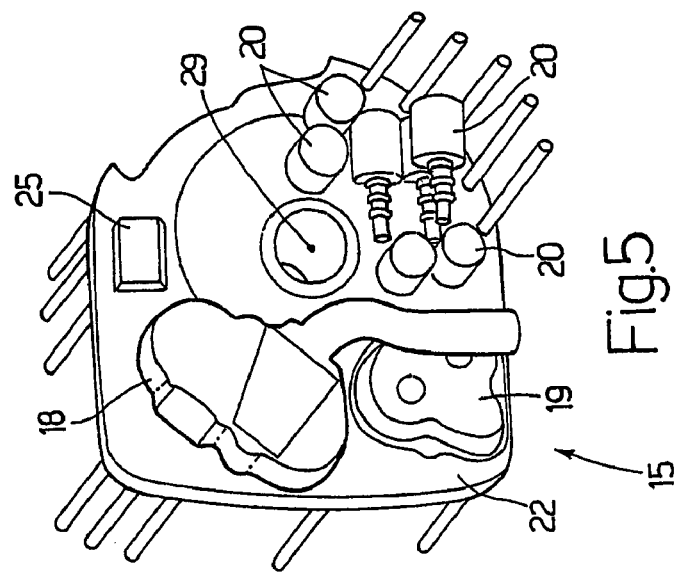
FIG. 5 shows a rear view in perspective of the FIG. 3 supporting plate.
Figure 4:
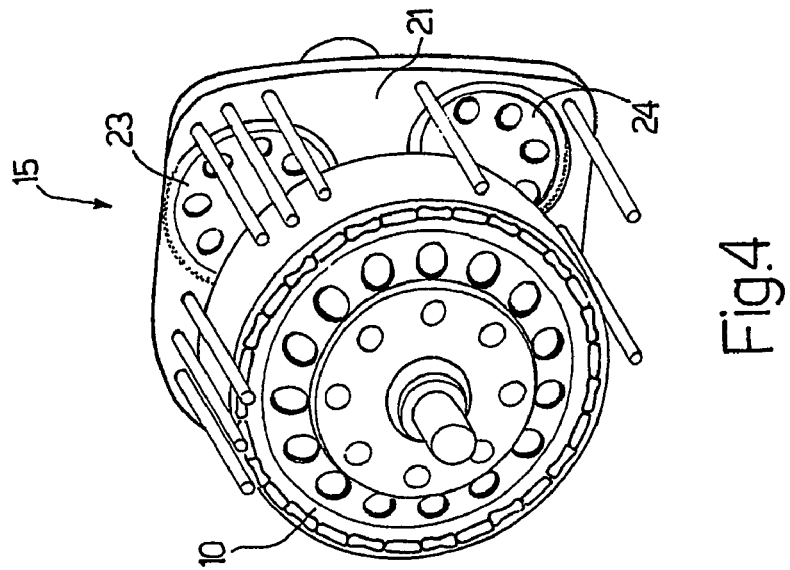
FIG. 4 shows a front view in perspective of the FIG. 3 supporting plate fitted with a clutch.
Figure 3:
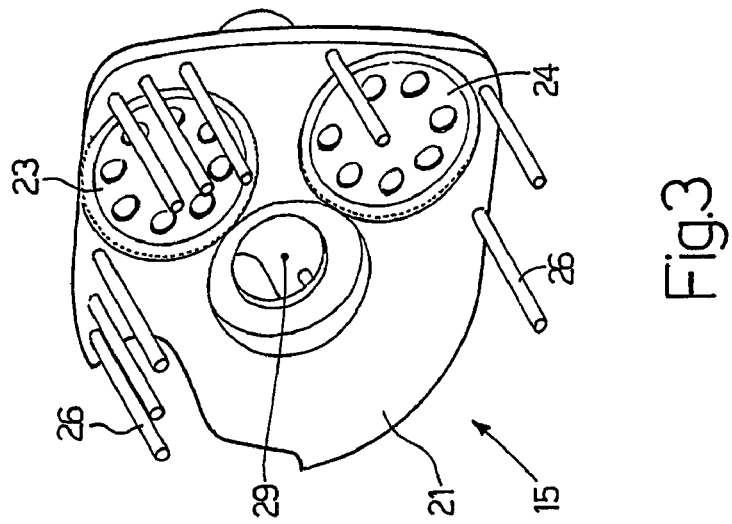
FIG. 3 shows a front view in perspective, with parts removed for clarity, of a supporting plate for supporting the FIG. 1 integrated clutch-transmission assembly.
Figure 7:
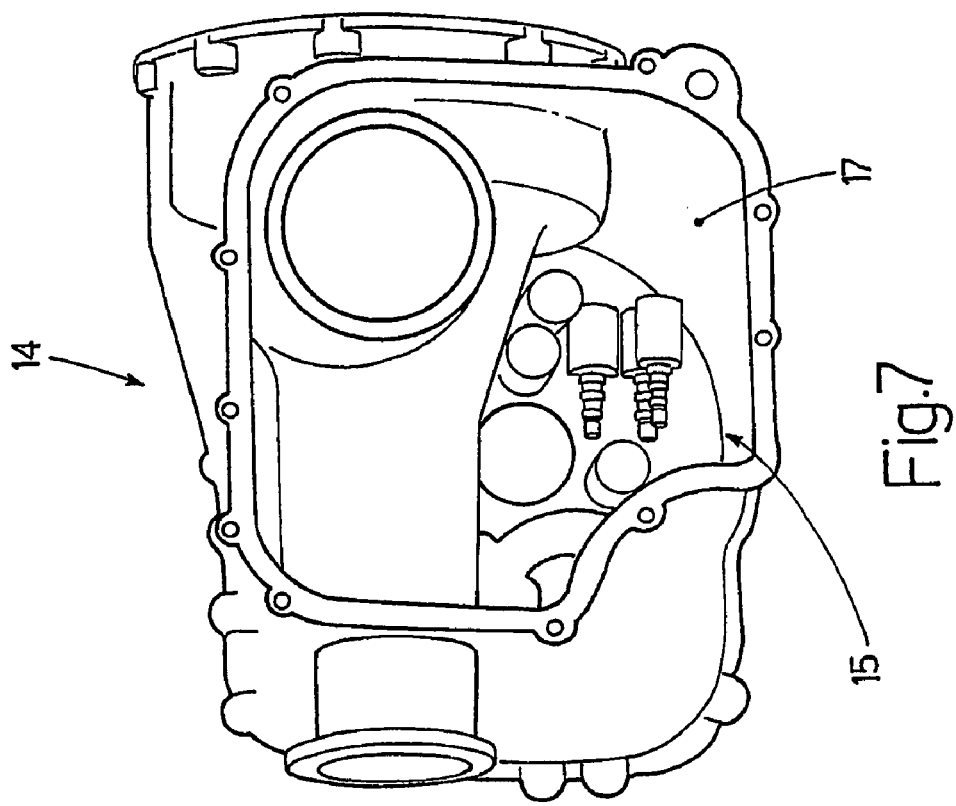
FIG. 7 shows a rear view in perspective of the FIG. 3 supporting plate inserted inside the integrated clutch-transmission assembly housing in FIG. 2.
Figure 6:
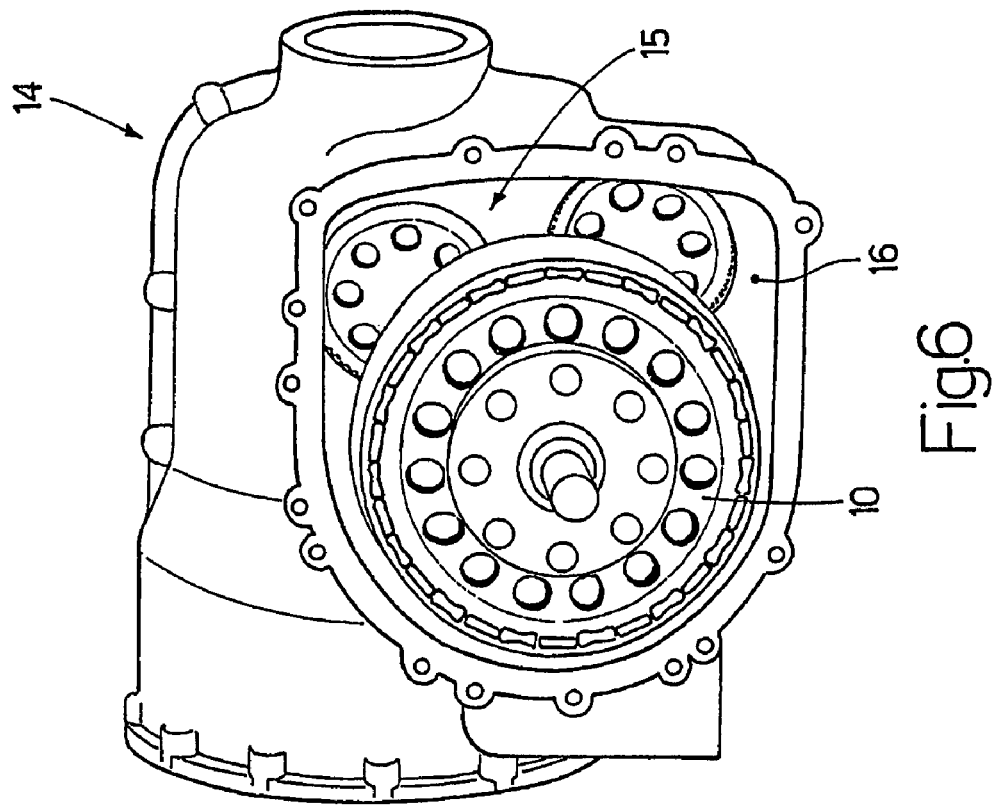
FIG. 6 shows a front view in perspective of the FIG. 3 supporting plate inserted inside the integrated clutch-transmission assembly housing in FIG. 2.

Number 1 in FIG. 1 indicates a car comprising two front driven wheels 2; and two rear drive wheels 3, to which is transmitted a drive torque generated by a front longitudinal internal combustion engine 4. More specifically, engine 4 comprises eight cylinders 5 arranged in two sets and connected mechanically to a longitudinal drive shaft 6, i.e., parallel to the traveling direction of car 1, which transmits the drive torque to rear drive wheels 3 via a power train 7.

Power train 7 comprises a longitudinal monolithic tubular propeller shaft 8 connecting drive shaft 6 to a rear integrated clutch-transmission assembly 9. Integrated clutch-transmission assembly 9 has a dual clutch 10 (in particular, an oil-bath disk clutch) cascade-connected to a dual-clutch transmission 11 for transmitting drive torque to a self-locking differential 12, which distributes the drive torque to the two rear drive wheels 3 by means of two axle shafts 13.

Figure 8:
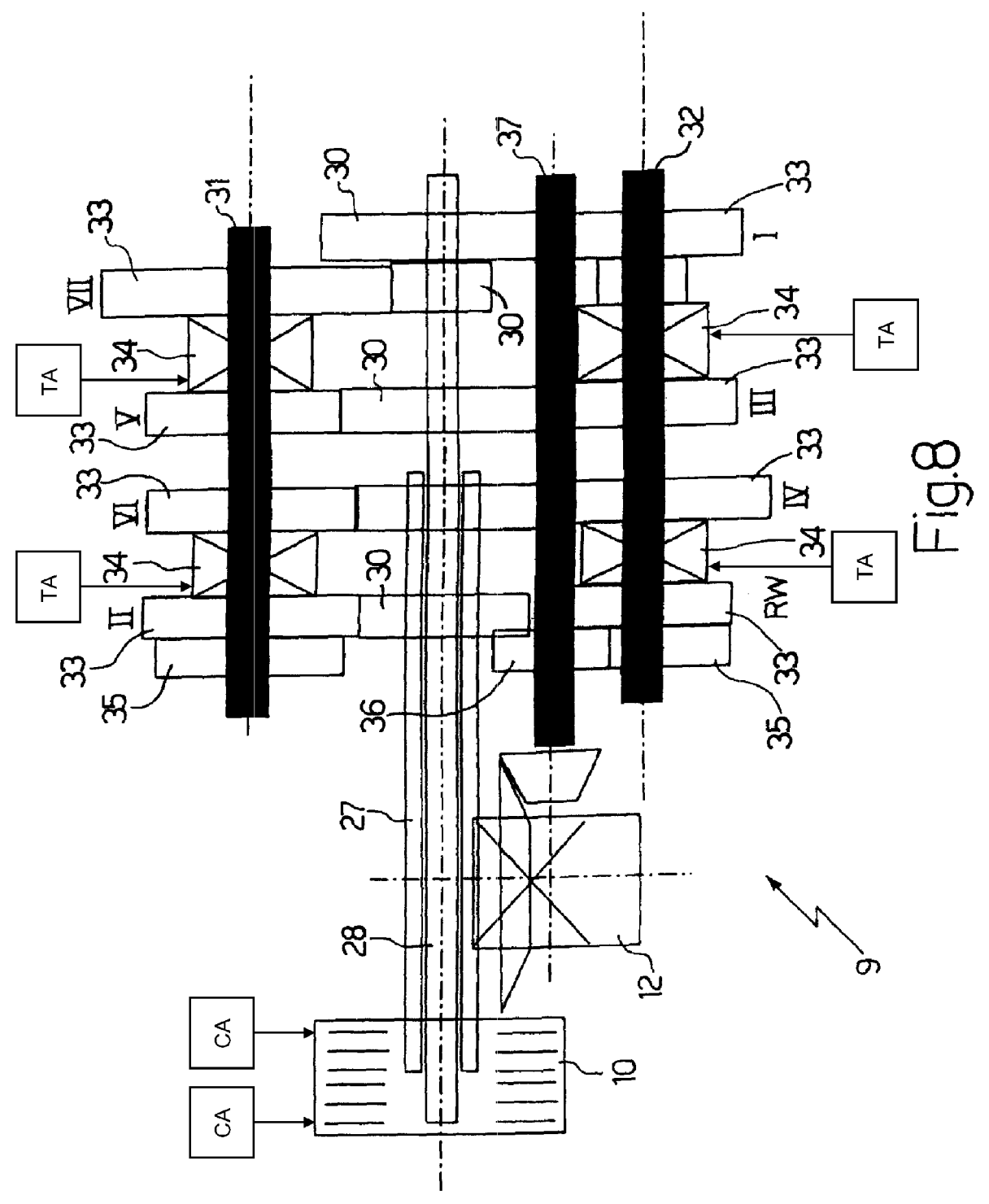

As shown in FIGS. 2 to 8, clutch-transmission assembly 9 comprises a housing 14 formed by joining a number of box bodies (not shown separately), and which houses power-assisted clutch 10 with a number of corresponding hydraulic actuators CA (shown in FIG. 8), and power-assisted transmission 11 with a number of corresponding hydraulic actuators TA (shown in FIG. 8). Self-locking differential 12 is preferably also housed in housing 14. Inside, housing 14 is divided by a flat supporting plate 15 into a chamber 16 housing clutch 10, and a chamber 17 housing transmission 11.

Clutch-transmission assembly 9 also comprises a high-pressure pump 18 for maintaining at high pressure a control fluid (typically oil) controlling the hydraulic actuators CA and TA (shown in FIG. 8) of clutch 10 and transmission 11; a circulating pump 19 for circulating a lubricating fluid (typically lubricating oil) to lubricate clutch 10 and transmission 11; and a number of solenoid valves 20 for controlling the hydraulic actuators CA and TA (shown in FIG. 8) of clutch 10 and transmission 11.

Flat supporting plate 15 has a wall 21, to which clutch 10 is fitted; and a wall 22 parallel to and opposite wall 21, and to which are fitted high-pressure pump 18, circulating pump 19, and at least some of solenoid valves 20. More specifically, wall 22 of supporting plate 15 may be fitted with all the solenoid valves 20 of clutch-transmission assembly 9, or with only solenoid valves 20 of clutch 10 and solenoid valves 20 of high-pressure pump 18. In an embodiment, supporting plate 15 has a number of connecting members (not shown in detail) projecting from wall 22 to support solenoid valves 20.

Supporting plate 15 comprises a gear 23 mounted for rotation on supporting plate 15 and for transmitting motion from propeller shaft 8, connected to the input of clutch 10, to high-pressure pump 18. Supporting plate 15 also comprises a gear 24 mounted for rotation on supporting plate 15 and for transmitting motion from propeller shaft 8, connected to the input of clutch 10, to circulating pump 19. More specifically, gears 23 and 24 are fitted centrally to respective drive shafts (not shown) of pumps 18 and 19, and mesh laterally with a further gear (not shown) of clutch 10, which receives motion directly from propeller shaft 8. In actual use, pumps 18 and 19 are therefore driven directly by propeller shaft 8, and therefore operate continually when engine 4 of car 1 is running.

Wall 22 of supporting plate 15 houses a memory device 25 for storing the calibration parameters of clutch 10 and solenoid valves 20 on supporting plate 15. In one possible embodiment, memory device 25 also stores the calibration parameters of transmission 11 and all the solenoid valves 20 of clutch-transmission assembly 9.

Supporting plate 15 is preferably housed removably inside housing 14. More specifically, supporting plate 15 comprises a number of long screws 26, which engage corresponding threaded seats in housing 14. This characteristic is extremely important by enabling assembly of all the relative component parts (clutch 10, pumps 18 and 19, solenoid valves 20, memory device 25) to supporting plate 15 outside housing 14, and subsequent insertion of the finished supporting plate 15 inside housing 14. This makes assembly of clutch-transmission assembly 9 much easier and faster, and also allows for thorough testing and calibration of the component parts (clutch 10, pumps 18 and 19, solenoid valves 20) beforehand, and for accordingly memorizing the calibration parameters in memory device 25 before the finished supporting plate 15 is inserted inside housing 14. For example, supporting plate 15 may be assembled by a first department or first contractor, and the finished supporting plate 15 inserted inside housing 14 by a second department or second contractor.

As shown in FIG. 8, the input of dual clutch 10 is connected to propeller shaft 8, and the two outputs of dual clutch 10 are connected respectively to two coaxial primary shafts 27, 28 of transmission 11 nested one inside the other, so that, by controlling dual clutch 10, each primary shaft 27, 28 may be connected selectively to propeller shaft 8 to receive the drive torque generated by engine 4. Supporting plate 15 has a through hole 29 (shown in FIGS. 3 and 5) for passage of primary shafts 27 and 28 of transmission 11, i.e., of output shafts 27 and 28 of clutch 10, from chamber 16 to chamber 17.

Each primary shaft 27, 28 supports two gears 30 angularly integral with primary shaft 27, 28. Transmission 11 comprises two secondary shafts 31 and 32, each supporting four gears 33 fitted in rotary manner to respective secondary shaft 31, 32 and which are selectively locked angularly to respective secondary shaft 31, 32 by two common synchronizing devices 34. It is important to point out that each synchronizing device 34 is common to two gears 33.

Each gear 33 meshes with a gear 30 with a given gear ratio corresponding to a given speed gear of car 1. More specifically, the Roman numerals in FIG. 8 indicate the speed gears corresponding to gears 33 (reverse gear is indicated RW). It is pointed out that each gear 30 meshes directly with relative gear 33, with the exception of reverse gear 30, which meshes with relative gear 33 with the interposition of a known idler (not shown) for inverting the rotation direction of secondary shaft 32.

Each secondary shaft 31, 32 supports an end gear 35, which is angularly integral with secondary shaft 31, 32 and meshes with a gear 36 angularly integral with an input shaft 37 of differential 12 with the interposition of a further gear (not shown in detail). Note that primary shafts 27, 28, secondary shafts 31, 32, and input shaft 37 are longitudinal.

In actual use, when one of primary shafts 27, 28 is connected to propeller shaft 8 by dual clutch 10, and one of gears 33 is locked angularly to one of secondary shafts 31, 32 by relative synchronizing device 34, motion is transmitted from primary shaft 27, 28 to a secondary shaft 31, 32 by gear 30 meshing with gear 33; and, downstream, motion is transmitted from secondary shaft 31, 32 to input shaft 37 of differential 12 by gears 35 and 36.

From the foregoing it will be appreciated that, although specific embodiments of the invention have been described herein for purposes of illustration, various modifications may be made without deviating from the spirit and scope of the invention.

The invention claimed is:
1. An integrated clutch-transmission assembly for a road vehicle;
the integrated clutch-transmission assembly comprising:
a power-assisted clutch having a number of corresponding first hydraulic actuators;
a power-assisted transmission having a number of corresponding second hydraulic actuators;
at least one high-pressure pump for the control fluid of the hydraulic actuators;
a number of solenoid valves for controlling the hydraulic actuators;
a common housing which houses the clutch with the first hydraulic actuators and the transmission with the second hydraulic actuators; and
a flat supporting plate, which is an inner wall of the housing and is completely housed inside the housing to divide the housing into a first chamber housing the clutch, and a second chamber housing the transmission;
wherein the flat supporting plate includes a first face supporting the clutch, and a second face parallel to and opposite the first face and supporting the high-pressure pump and at least some of the solenoid valves.

2. An integrated clutch-transmission assembly as claimed in claim 1, wherein the supporting plate is housed removably inside the housing to enable assembly of all the relative component parts to the supporting plate outside the housing and subsequent insertion inside the housing of the finished supporting plate provided with the relative component parts.

3. An integrated clutch-transmission assembly as claimed in claim 2, wherein the supporting plate comprises a number of long screws which engage corresponding threaded seats in the housing.

4. An integrated clutch-transmission assembly as claimed in claim 1, wherein the supporting plate comprises a gear mounted for rotation on the supporting plate and which transmits motion from an input shaft of the clutch to the high-pressure pump.

5. An integrated clutch-transmission assembly as claimed in claim 1, further comprising a circulating pump for the lubricating fluid of the clutch and transmission, which circulating pump is mounted on the second face of the supporting plate.

6. An integrated clutch-transmission assembly as claimed in claim 1, wherein the second face of the supporting plate is fitted only with the solenoid valves of the clutch and the solenoid valves of the high-pressure pump.

7. An integrated clutch-transmission assembly as claimed in claim 1, wherein the supporting plate has a number of connecting members projecting from the second face to support the solenoid valves.

8. An integrated clutch-transmission assembly as claimed in claims 1, wherein the supporting plate has a through hole for passage of an output shaft of the clutch from the first chamber to the second chamber.

9. An integrated clutch-transmission assembly as claimed in claims 1, and comprising a memory device housed on the supporting plate and for storing the calibration parameters of the clutch and of the solenoid valves on the supporting plate.

10. An integrated clutch-transmission assembly as claimed in claim 1, wherein the clutch is a dual clutch, and the transmission is a dual-clutch transmission.

11. An integrated clutch-transmission assembly as claimed in claim 10, wherein the transmission comprises two primary shafts selectively driven by an input shaft of the clutch with the interposition of the clutch itself; a number of first gears rotated by the primary shafts; two secondary shafts connected to an input of a differential; and a number of second gears, each of which is supported by a respective secondary shaft and meshes with a relative first gear with a given gear ratio corresponding to a given speed gear.

12. An integrated clutch-transmission assembly as claimed in claim 11, wherein each secondary shaft is permanently connected to the input of the differential; each second gear is fitted in rotary manner to a respective secondary shaft; and coupling means are provided to selectively lock each second gear angularly to a respective secondary shaft.

13. An integrated clutch-transmission assembly as claimed in claim 11, wherein the primary shafts are mounted coaxially with each other and with a propeller shaft which transmits motion to the clutch.

14. An integrated clutch-transmission assembly as claimed in claim 11, wherein each first gear is fitted in angularly fixed manner to the relative primary shaft.

15. An integrated clutch-transmission assembly as claimed in claim 11, wherein the differential is housed inside the housings.

* * * * *